United States Patent
Koufos et al.

(10) Patent No.: US 11,580,765 B2
(45) Date of Patent: Feb. 14, 2023

(54) METHOD AND SYSTEM FOR DETECTING PHYSICAL PRESENCE

(71) Applicant: Tobii AB, Danderyd (SE)

(72) Inventors: Dimitrios Koufos, Danderyd (SE); Erland George-Svahn, Danderyd (SE); Magnus Ivarsson, Danderyd (SE)

(73) Assignee: TOBII AB, Danderyd (SE)

( * ) Notice: Subject to any disclaimer, the term of this patent is extended or adjusted under 35 U.S.C. 154(b) by 0 days.

(21) Appl. No.: 17/010,383

(22) Filed: Sep. 2, 2020

(65) Prior Publication Data

US 2021/0064856 A1 Mar. 4, 2021

(30) Foreign Application Priority Data

Sep. 2, 2019 (SE) .................................. 1950995-9

(51) Int. Cl.
*G06V 40/10* (2022.01)
*G01S 15/04* (2006.01)
(Continued)

(52) U.S. Cl.
CPC ............ *G06V 40/10* (2022.01); *G01J 5/0025* (2013.01); *G01S 15/04* (2013.01); *G01S 17/04* (2020.01); *G06K 9/6289* (2013.01); *G06T 7/20* (2013.01); *G06T 7/73* (2017.01); *G06V 10/98* (2022.01); *G06V 40/161* (2022.01);
(Continued)

(58) Field of Classification Search
CPC ........ G06V 10/98; G06V 20/52; G06V 40/10; G06V 40/161; G06V 40/168; G06V 40/20; G06V 40/23; G01J 5/0025; G01S 15/04; G01S 17/04; G01S 7/4815; G01S 7/484; G01S 17/06; G01S 7/497; G06K 9/6289; G06T 2207/30201; G06T 7/20; G06T 7/73

See application file for complete search history.

(56) References Cited

U.S. PATENT DOCUMENTS

2011/0134250 A1 6/2011 Kim et al.
2014/0267034 A1 9/2014 Krulce et al.
(Continued)

OTHER PUBLICATIONS

SE19550995-9, "Official Action", dated Feb. 28, 2020, 9 pages.

*Primary Examiner* — Nizar N Sivji
(74) *Attorney, Agent, or Firm* — Kilpatrick Townsend & Stockton LLP

(57) ABSTRACT

A method including providing a sensor device including one or several sensors. The sensor device is arranged to perform at least one high-power type measurement and at least one low-power type measurement and includes at least one image sensor arranged to depict a person by a measurement of said high-power type. Each of the low-power type measurements over time requires less electric power for operation as compared to each of the high-power type measurements. The method includes detecting a potential presence of the person using at least one of said low-power type measurements. The method includes producing, using one of the high-power type measurements, an image depicting a person and detecting a presence of the person based on im-age analysis of the image. The method includes detecting, using at least one of the low-power type measurements, a maintained presence of the person. The method includes failing to detect a maintained presence of the person.

19 Claims, 3 Drawing Sheets

(51) Int. Cl.
  *G01J 5/00*    (2022.01)
  *G01S 17/04*   (2020.01)
  *G06T 7/20*    (2017.01)
  *G06T 7/73*    (2017.01)
  *G06K 9/62*    (2022.01)
  *G06V 10/98*   (2022.01)
  *G06V 40/20*   (2022.01)
  *G06V 40/16*   (2022.01)

(52) U.S. Cl.
  CPC ............ *G06V 40/168* (2022.01); *G06V 40/20* (2022.01); *G06T 2207/30201* (2013.01)

(56) References Cited

U.S. PATENT DOCUMENTS

| | | | |
|---|---|---|---|
| 2016/0080652 A1 | 3/2016 | Shirota et al. | |
| 2017/0132466 A1 | 5/2017 | Gousev et al. | |
| 2017/0265034 A1* | 9/2017 | Yu | G06F 1/3287 |
| 2018/0004275 A1 | 1/2018 | Tubbs et al. | |
| 2018/0321731 A1 | 11/2018 | Alfano et al. | |
| 2018/0335508 A1* | 11/2018 | Lewis | G01S 7/4815 |
| 2019/0213309 A1* | 7/2019 | Morestin | G01S 7/4865 |
| 2021/0117818 A1* | 4/2021 | Teng | G06F 3/017 |

\* cited by examiner

METHOD AND SYSTEM FOR DETECTING PHYSICAL PRESENCE

TECHNICAL FIELD

The present invention relates to a method for detecting the physical presence of a person. The invention also relates to a system and to a computer software function for performing such a method.

BACKGROUND OF THE INVENTION

In many applications, it is important to know if a person is present at a particular expected location. For instance, a computer or smartphone screen can be dimmed or switched off when not being used, but should light up again when needed.

In other applications, it is useful to know if a person who is present is actually focusing attention towards a particular entity, such as on a screen or on some object being displayed on a screen.

In yet other applications, such as in authentication applications, it is necessary to identify a detected present person.

There exist many known ways of achieving such person detection, based on, for instance, image analysis, password entering via keyboard and biometric input. However, such identification is often complicated or perceived as cumbersome. A frequent problem is also that a person needs to re-perform certain steps, such as moving a computer mouse, to maintain a system in an active mode if too much time has elapsed since the last detection of the person.

Solutions for maintained person detection exist, but such solutions are however relatively heavy consumers of power and/or computer resources. Further, some of those solutions do not detect people in a robust and reliable way.

In many applications the processor used for presence detection is powered using a battery, having limited capacity. If instead powered by a wired mains, the use of electrical energy is ultimately associated with both cost and environmental load.

For these and other reasons, there is a desire not to unnecessarily spend processor power on detecting a person. The present invention solves this problem, providing a solution requiring less energy over time.

Furthermore, the solution according to the present invention achieves a more robust detection of a person under varying and complex conditions, such as when the person moves around in front of a screen on which a scene is displayed, and/or when the person has several screens that are used at the same time.

SUMMARY OF INVENTION

Hence, the invention relates to a method for detecting the physical presence of a person at an expected person location, the method comprising the steps: a) providing a sensor device comprising one or several sensors, the sensor device being arranged to perform at least one high-power type measurement and at least one low-power type measurement, wherein the sensor device comprises at least one image sensor arranged to depict the person by a measurement of said high-power type, and wherein each of said low-power type measurements over time requires less electric power for operation as compared to each of said high-power type measurements; b) the sensor device detecting said potential presence of the person using at least one of said low-power type measurements; c) using one of said high-power type measurements, the sensor device producing an image depicting the person and detecting the presence of the person based on image analysis of said image; d) using at least one of said low-power type measurements, the sensor device detecting a maintained presence of the person; e) the sensor device failing to detect a maintained presence of the person; and f) reiterating to step b).

Furthermore, the invention relates to a system arranged to detect the physical presence of a person at an expected person location, the system comprising a sensor device comprising one or several sensors, the sensor device being arranged to perform at least one high-power type measurement and at least one low-power type measurement, wherein the sensor device comprises at least one image sensor arranged to depict the person by a measurement of said high-power type, and wherein each of said low-power type measurements over time requires less electric power for operation as compared to each of said high-power type measurements, wherein the system is arranged to: a) cause the sensor device to detect said potential presence of the person using at least one of said low-power type measurements; b) cause the sensor device to, using one of said high-power type measurements, produce an image depicting the person and detect the presence of the person based on image analysis of said image; c) cause the sensor device to, using at least one of said low-power type measurements detect a maintained presence of the person; d) detect a failure by the sensor device to detect a maintained presence of the person; and e) reiterate to step b).

Moreover, the invention relates to a computer software function arranged to, when executing, detect the physical presence of a person at an expected person location, the computer software function being arranged to communicate with a sensor device comprising one or several sensors, the sensor device being arranged to perform at least one high-power type measurement and at least one low-power type measurement, wherein the sensor device comprises at least one image sensor arranged to depict the person by a measurement of said high-power type, and wherein each of said low-power type measurements over time requires less electric power for operation as compared to each of said high-power type measurements, wherein the computer software function is arranged to, when executed, perform the following steps: a) causing the sensor device to detect said potential presence of the person using at least one of said low-power type measurements; b) causing the sensor device to, using one of said high-power type measurements, produce an image depicting the person and detect the presence of the person based on image analysis of said image; c) causing the sensor device to, using at least one of said low-power type measurements detect a maintained presence of the person; d) detecting a failure by the sensor device to detect a maintained presence of the person; and e) reiterating to step b).

In the following, the invention will be described in detail, with reference to exemplifying embodiments of the invention and to the enclosed drawings, wherein:

DETAILED DESCRIPTION

Figure 1A:
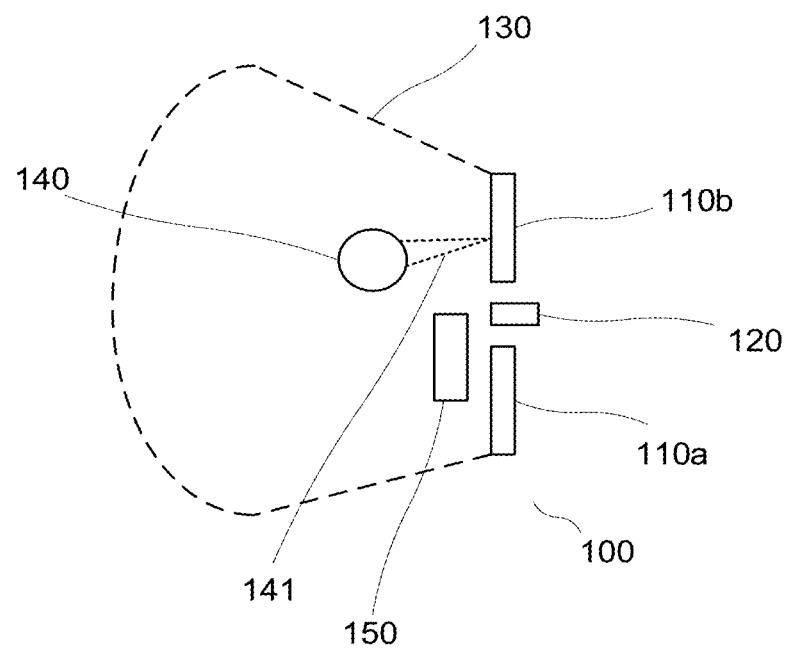
FIG. 1a is a diagram of a first system according to the present invention, arranged to perform a method according to the present invention by executing a computer software function according to the invention.

FIG. 1a illustrates a system 100 according to the present invention, which may be used with, or may comprise, a not shown computer device, such as a generally programmable computer device. Such a computer device may be or comprise the below-described control device. The computer device may be a standalone piece of hardware, and/or be distributed on several physically separated but communicating pieces of hardware.

Generally, a method according to the present invention may be implemented using a CPU and/or GPU processor of said computer device. A computer software function according to the present invention may be arranged to execute on said computer, and to thereby perform a method according to the present invention.

Hence, on the said computer device, a piece of software according to the present invention is arranged to be executed, performing the method steps of a method according to the present invention. A system according to the present invention comprises said computer device on which said software is arranged to execute, to perform a method according to the present invention. A system according to the present invention may also comprise the software as such.

The system 100 comprises a sensor device 120, in turn comprising one or several individual sensors for detecting a user or person 140 within a particular expected person area or location 130. Each of said sensors may be associated with a different respective reach or detection field covering the whole or part of such an expected person location 130. In FIG. 1a, the sensor device 120 is illustrated as one, discreet component. It is however realized that the sensor device may comprise several interconnected sensors and any additional hardware components, arranged to interact with each other wirelessly or using any other suitable communication means.

In FIG. 1a, the expected person location 130 is illustrated using broken lines as a detection sector in which the person 140 would normally be present when using one or both of a pair of display screens 110a, 110b. Purely as an example, the screens 110a, 110b may be conventional stationary computer screens. However, such a screen may also be the screen of a handheld device, such as a laptop computer screen, a smartphone screen or a smartwatch screen. The screen may be worn by the person 140 or may be at rest for instance on a table surface. Further, the sensor device 120, or individual sensors of the sensor device 120, may be incorporated into any screen 110b, laptop, smartphone or similar. The above-mentioned computer device may be a computer device providing image signals to said display screens 110a, 110b, such as a computer executing a computer game or similar which is being played by the person 140 and viewed on the display screens 110a, 110b.

In the illustrative example of FIG. 1a, the presence of the person 140 is detected in relation to the screens 110a, 110b. However, it is understood that the present invention is applicable also when the person presence is detected in relation to another entity than a computer screen, such as a web conference camera or a hologram-displaying device.

It is further understood that the area or location 130 in general may be a particular subset of space in which a person to be detected would normally be located. The area or location 130 is generally defined in terms of a field or area in relation to the sensor device 120. Herein, the term "expected person location" will be used, for reasons of simplicity.

As will be described in more detail below, the sensor device 120 may comprise one or several physical sensors, which sensors may be of different types.

For instance, the sensor device 120 may comprise one or several image sensors, arranged to depict part or the whole of the expected person location 130 by capturing visible or non-visible light and recording a field of view onto a pixmap or corresponding. As will become clear, according to the present invention there is at least one such image sensor in the sensor device 120.

However, the sensor device 120 may also comprise one or several of a sound, a movement, a time-of-flight, a distance, a temperature, an ultrasound or a light sensor, or any other type of sensor arranged to measure a physical property of the expected person location 130. For instance, such sensors may comprise a LIDAR sensor, a heat camera sensor, a microphone or a mechanical force sensor. In the particular example of FIG. 1a, a computer mouse and/or keyboard 150 is shown, which may be used as a sensor by the sensor device 120 so that the sensor device 120 detects when the person 140 interacts physically with the mouse and/or keyboard 150, for instance via a computer to which both the sensor device 120 and the mouse and/or keyboard 150 is connected. In this case, the sensor device 120 may be arranged to read such keyboard/mouse 150 activity, which detection then constitutes a sensing by the sensor device 120.

Many more examples are thinkable for measuring physical properties that can be used for detecting any aspect of an actual or potential presence, or even identity, of the person 140. What is important is that the measured (potential) presence is a physical one, locally in the expected person location 130.

The system 100, such as the sensor device 120, may also comprise an attention detection subsystem, arranged to detect and analyse a current gaze direction, or a region/object of attention of the person 140. In particular, the presence detection according to the present invention may be used as an input to a decision algorithm controlling the on/off state of such an attention detection. The attention detection subsystem may use the image sensor of the sensor device 120 or another image sensor. Further, the attention detection subsystem may determine the region of attention or the gaze direction based on specific algorithms using adaptive machine learning. Yet further, the attention detection system may determine the region/object of attention or the gaze direction based on active illumination of at least one of the eyes, i.e. glint based gaze tracking. Further, attention detection system may comprise a sensor for detecting a head pose of the person.

Figure 1B:
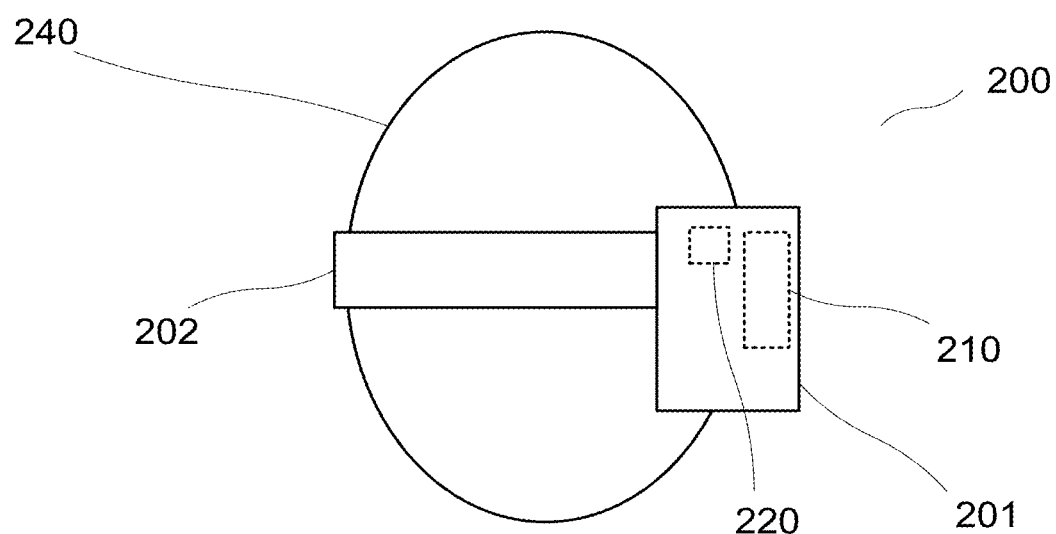
FIG. 1b is a diagram of a second system according to the present invention, arranged to perform a method according to the present invention by executing a computer software function according to the invention.

FIG. 1b illustrates a second example of a system 200 according to the present invention. In this case, the person 240 wears a stereoscopic headset 201 comprising a pair of internal screen displays 210 and a sensor device 220. The headset 201 may be held in place using a headband 202.

In this second example, the sensor device 220 may comprise an image sensor, such as a camera arranged to depict the eyes or any other facial feature of the wearing person 240 and which may form part of an attention detection system as mentioned above. The sensor device 220 may also comprise a contact sensor arranged to detect a physical contact between the person's 240 head and the headset 201. In FIG. 1*b*, the above described computer device may, for instance, be incorporated into the headset 201 or a standalone computer or smartphone in communication with the headset 201.

According to the present invention, the sensor device 120, 220 is arranged to perform at least one high-power type measurement and at least one low-power type measurement. In each of such measurements, one or several individual sensors of the sensor device are controlled, by the sensor device, to perform detection of one or several physical properties of the expected person location in a predetermined way. Hence, one and the same sensor may be used in several different of said measurements performed by the sensor device.

The sensor device 120, 220 may be arranged to perform such measurements independently, in other words one, several or all available high-power or low-power type measurements may be performed irrespectively of if another measurement is performed at the same time. Hence, the sensor device 120, 220 may be arranged so that, at any given time, several of said measurements can be performed at the same time. In particular, a high-power type measurement may be performed at the same time as a low-power type measurement.

In practise, several different measurements may exploit one and the same sensor. This may mean, for example, that an image sensor is used at the same time for a high-power type measurement (such as the detection of a facial feature of a person depicted in an image captured by the image sensor) and a different low-power type measurement (such as a much simpler statistical processing of the same or a different captured image with the purpose of detecting movement). In this case, it may not be the capturing of the image that differs in power requirement, but instead a respective algorithm used to digitally analyse the captured image. However, it would also be possible that the image sensor as such is arranged to perform different types of capture, such as using several different pixel resolutions.

Each "measurement" of said types may exploit one or several of said sensors.

The sensor device 120, 220 may be controlled by a control device which is external to the sensor device but also comprised in the system according to the present invention, or the sensor device may comprise its own internal control device, arranged to communicate with sensor device-external functionality via an API. Any control performed by the control device may be achieved by a control software function, in turn forming part of a computer software function according to the present invention.

It is understood that a system according to the present invention will typically be implemented in a combination of hardware (such as the said physical sensor(s) and any general-purpose programmable hardware on which the control software function is executed) and software (such as a computer software function of the present type including a control software function of the sensor device).

It is preferred that said control software function is or is comprised in a computer software function according to the present invention, which may be arranged to at least partly execute on hardware of the sensor device and to interact with system-external functions via an API. It is understood that the sensor device may be arranged not to have its own hardware, but that such control software may then execute on a general-purpose programmable computer also providing an image signal to a display screen in geometric relation to which the person is to be detected in said expected person location, which computer is then also used to perform other tasks. However, the sensors of the sensor device will be implemented in hardware to at least some extent, since they need to interact with physical reality for the detection of the person.

Further according to the present invention, the sensor device 120, 220 comprises, as one of said sensors, at least one image sensor arranged to depict the person in a high-power type measurement performed the sensor device. The image sensor may as such be any suitable kind of sensor, but may be a digital image sensor arranged to achieve a digital pixmap memory representation of the captured image on which digital image analysis can be performed. The image sensor may be integrated into a computer device, such as a laptop, or may be a standalone image sensor.

The sensor device 120, 220 is further arranged to, using a low-power type measurement, detect a potential presence of the person. That the low-power type measurement is for detecting a "potential presence" means that such detection is indicative of a person being present but that such presence has to be verified by additional sensor measurement (and in particular a high-power type measurement) before such actual presence can be finally established. This will be detailed and clarified below.

The terms "high-power type measurement" and "low-power type measurement" are to be interpreted in a manner where they are relative to each other, such that each particular low-power type measurements over time will require less electric power for operation as compared to each of said high-power type measurements. In case of discreet measurement, this means that a one-off low-power type measurement event will require less energy than a one-off high-power type measurement. However, in many cases measurements of any type will be performed intermittently or even continuously over time, such as for detecting a potential or actual presence with the purpose of detecting a state change from "not present" to "present" or similar. Then, any such lower-power type measurement will, over time, require less power than any such high-power type measurement.

Hence, operating the sensor device 120, 220 for performing a particular "high-power type measurement" will require a higher time-averaged power than operating the sensor device 120, 220 for performing a particular "low-power type measurement". This holds true for any combination of a high-power type measurement and a low-power type measurement of the types described herein. It is also understood that this power requirement is only considered for the measurement as such, and that the performance of a high-power type measurement at the same time as the performance of a low-power type measurement would likely require even more power than only operating the sensor device for high-power type measurements.

In case a sensor device 120, 220 is arranged to perform more than one type of measurements of either type, these can be grouped together in a group of at least one high-power type measurements and a different group of at least one low-power type measurements, where all the measurement types in the high-power group are associated with higher operating power than the operating power of any measurement type in the low-power group.

In some applications, the respective time-averaged power requirement, and in particular total processor load (number of processor cycles per time unit required) associated with each high-power type measurement is at least ten times as high as that associated with any low-power type measurement.

It is understood that the sensor device 120, 220 may be arranged to perform two or more different high-power type measurement. Furthermore, in some embodiments the sensor device 120, 220 is arranged to perform only one single low-power type measurement.

Typically, the said control device can cause the sensor device 120, 220 to perform any one of said measurement types at any time, as a way to control the operation of the sensor device 120, 220.

Each one of the sensors may be used exclusively for only one of said measurement types, or selectively for several different measurement types. For instance, an image sensor may be used in a high-power type measurement for, using digital image analysis, automatically detect and analyse facial features of the person. Such detection is typically relatively processor demanding. The same image sensor may then also be used in a low-power type measurement for, using less complex digital image analysis and hence smaller processor load, detecting a rough contour of a depicted person, or even only for detecting a movement in the depicted image. In other words, one and the same sensor can provide measurement data to the sensor device, which measurement data is processed in differently demanding ways depending on the currently performed type of measurement.

Figure 2:
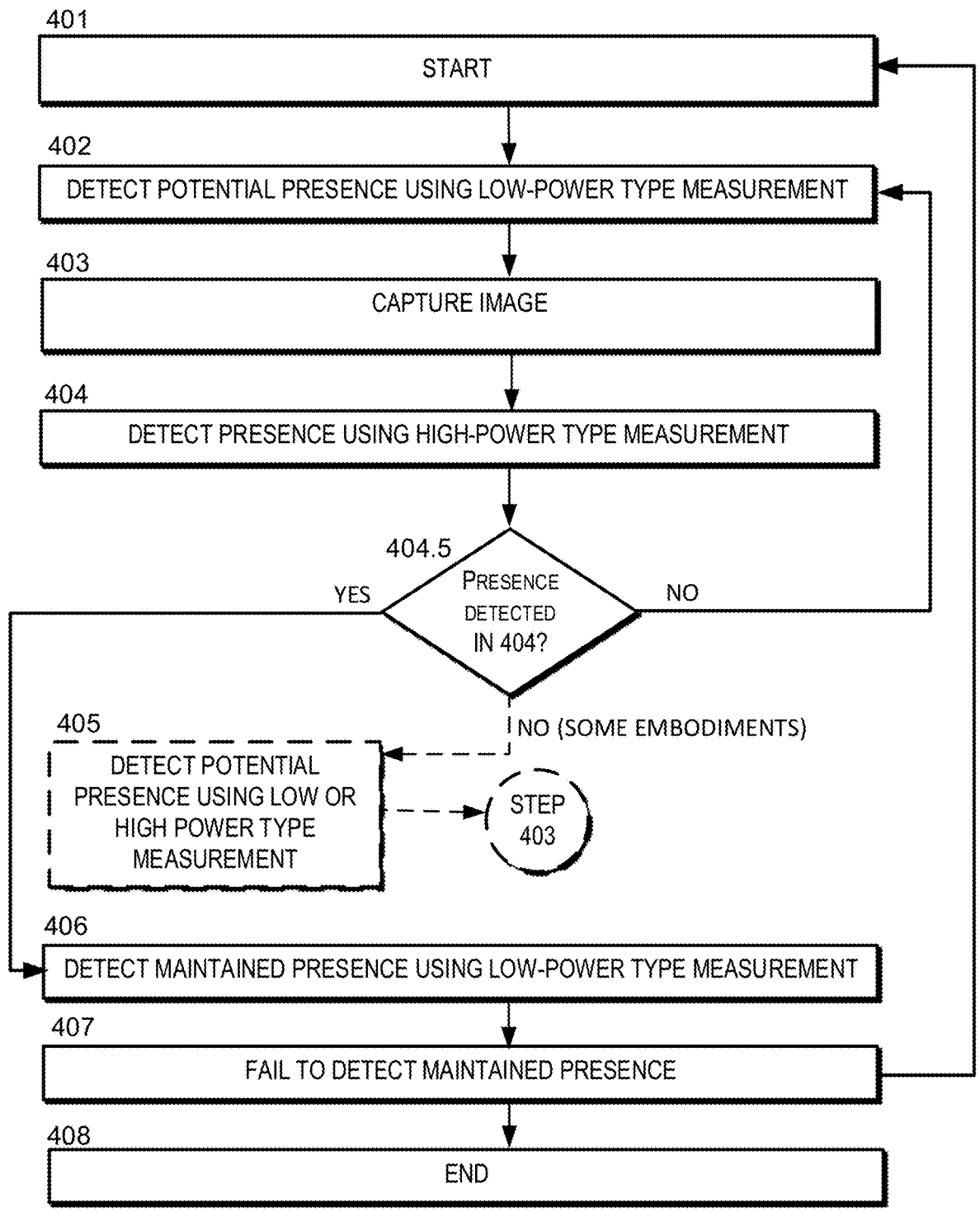
FIG. 2 is a flow chart illustrating a method according to the present invention.

FIG. 2 illustrates a method according to the present invention, for detecting the physical presence of a person at a particular expected person location.

In a first method step 401, the method starts.

In a subsequent step 402, the sensor device 120, 220 performs at least one of its said at least one low-power types of measurement. In this step, it is preferred that no high-power type measurements are performed. The result of this low-power type of measurement performed in this step 402 may be that the sensor device 120, 220 detects a potential presence of the person. Of course, it may also be the case that the sensor device 120, 220 detects no such potential presence, in particular in case there is no person present in the expected person location.

What such a potential presence means will be exemplified below. However, in general such a detection of a potential presence implies that a person may be present with some probability, which probability is lower than a probability required for definitively coming to the conclusion that there is in fact a person present given due consideration to the practical considerations in the case at hand, such as the constitution of the expected person location, the type of sensors used for detection and requirements in terms of security, power usage and similar. In particular, the detection of a potential presence implies a probability which is lower than a corresponding probability for an actual detection by the sensor device performing a high-power type measurement. Put simply, a potential presence of said type, which is detected by the sensor device using one or several of its low-power type measurements, may be verified to a required certainty using a positive detection by the sensor device performing a high-power type measurement.

The sensor device 120, 220, using a low-power type measurement, may check for a detection of a potential presence repeatedly or continuously. Then, subsequent step 403 may be performed when (if) such potential presence is detected.

Namely, in a subsequent step 403, a high-power type measurement is performed using the above-mentioned image sensor for performing a digital image analysis of a captured image, which image constitutes a depiction of at least part of the expected person location. It is noted that this step 403 is not performed until a potential presence has been detected.

Hence, in step 403 the sensor device produces an image depicting the person and detects, in a subsequent step 404, the actual presence of the person based on image analysis of said image.

The production of the image may be caused by a command from said control device using said control software function, and the captured image may be any image captured using the above described image sensor of the sensor device. The image may be a still image or form a part of (or constitute) a series of images, such as a video stream.

The image analysis is a digital image analysis performed by the sensor device, for instance by a computer software function of the present type executing on hardware belonging to the sensor device, the control device or any other general-purpose programmable hardware. The image analysis itself may also be outsourced to a remote service.

As such image analysis is conventional as such, it will not be described herein in any detail. However, merely by example such image analysis may comprise more or less advanced/complex detection of various predefined textual or contextual image features and be based on statistical and/or rule-based sweeping-window and/or whole-image based analysis techniques.

It is noted that, since the sensor device performs high-power type measurements, the detection will normally comprise a relatively advanced digital image analysis. For instance, a physical feature, such as a facial feature of the person such as a nose, eyes, ears or an entire face of the present person, may be extracted and identified from the captured image, and the image analysis may also comprise an identification or even authentication step (see below).

In particular, the detection in step 404 is preferably a verification of the potential detection of step 402. In other words, the detection in step 404 constitutes a detection of a true presence of the person.

The image capturing and detection of steps 403 and 404 may be performed several times, depending on application. This will be explained in detail below.

As shown in step 404.5, if no detection was possible using the high-power type measurement in step 404, the method may reiterate to step 402 for another low-power type measurement attempt of detection potential presence.

However, if an actual presence was detected in step 404.5, the method proceeds to a subsequent step 406, in which a maintained presence of the person is detected. This detection is performed using low-power type measurement, why the time-averaged power-usage of the sensor device decreases.

Preferably, and as will be exemplified below, such maintained presence detection is performed based on the actual presence detection made in steps 404 and 404.5 performed by the sensor device 120, 220 using said high-power type measurement or later performed such high-power type measurement/detection of actual presence of the person. For instance, the sensor device 120, 220 may use for such subsequent low-power type measurement detection information provided by the previous high-power type measurement detection, such as information regarding where in a captured image (or in 3D space) the actually detected person is located within the expected person location.

The maintained presence detection may also be performed using low-power type measurements but with intermediary use of high-power type measurements, as will be exemplified below. Hence, the sensor device 120, 220 may be used temporarily in a high-power mode and then again be used in a default low-power mode during the performance of the maintained presence detection step 406.

In a subsequent step 407, the sensor device 120, 220 fails to detect a maintained presence of the person. As a result, the method may reiterate to step 402. For instance, the failure of detection of maintained presence during a predetermined minimum time period will result in that such maintained presence is deemed not to have been detected, why the method may reiterate to step 402.

In a subsequent step 408, the method ends.

Using such a method, a person can be detected at the expected person location with high reliability but minimal power usage. This is useful in many applications, as has been exemplified in the introductory part of the present application and will be further detailed below.

In some embodiments, the sensor device 120, 220 comprises a non-image-based sensor of the above exemplified or any other type, arranged to be used in at least one low-power type measurement, to detect a local presence of an object at said expected person location. In particular, the sensor device may comprise a non-image thermal sensor, time-of-flight sensor, movement sensor, sonar and/or sound sensor arranged to, in at least one of said at least one low-power type measurements, detect a geometric shape, a local movement or a sound having typically human characteristics in the sense that the shape, local movement or sound typically and predictably accrues as a result of the presence of the person itself and/or of a voluntary or involuntary activity that the person performs. For instance, a breathing sound may be detected based on a rule-based interpretation of captured sound information, taking into consideration known frequencies and time patterns being typical of human breathing.

In other examples, the low-power measurements may use an image-based sensor, such as an image-capturing thermal camera used to detect a peripheral shape of a higher-than-background tempered foreground part of a thermally captured image and compare this shape to known parameters relating to such shapes to determine if the shape is potentially that of a human.

As described earlier, the system according to the present invention may furthermore comprise an attention detection means, which is for instance a part of the sensor device 120, 220. Said attention detection means may then be activated for the detection of an attention focus of the detected person the presence of which has been detected at said expected person location.

Such detection of an attention focus may be performed using the above described image sensor of the sensor device 120, 220, and may constitute an integrated part of the above-described detection by the sensor device, and in particular as a part or result of a high-power type measurement. For instance, a current head facing direction of a detected person can be detected and related to, for instance, a computer display screen, whereupon it may be determined whether or not a face of the person currently faces the computer display screen or not. In other examples, a gaze direction or a region of attention of the person may be detected (as described above), and it may be determined whether or not the person presently looks at a particular object, such as a virtual object displayed on a display screen.

Such attention may be activated in connection to the detection of the presence of the person in step 404; maintained person attention may be detected in step 406; and the attention detection means may be inactivated for the detection of said attention focus of the person once a maintained presence of the person is no longer detected in step 407. Therebetween, a low-power sensing type measurement performed by the sensor device 120, 220 may be used in a manner corresponding to the detection of maintained person presence, possibly using intermittent re-verification using a high-power type measurement comprising a person attention detection. For instance, maintained attention may be detected using a low-power type measurement by detecting that a peripheral shape of a detected person's head does not move more than a predetermined distance or angle.

In general, the expected person location may comprise a display screen of the above described type, and the attention focus of the person may then be detected in relation to such a display screen.

In yet other embodiments, the present system may comprise a person identity means, which may also be functionally comprised in the sensor device 120, 220. Then, the present method may comprise the person identity means being activated for the detection, using said image sensor in a high-power type measurement performed by the sensor device 120, 220, of the identity of the person when the presence of the person has been detected at said expected person location.

In a way corresponding to said person attention detection, the activation of the person identity means may be activated in connection to the detection of the presence of the person in step 404, and may be inactivated for the detection of a person identity once a maintained presence of the person is no longer detected in step 407. The identity may be performed using per se conventional image-based identity-matching techniques in which physical features detected in the person's face are matched to a known set of biometric information of the person; a photograph of the person; or using any other suitable image-based techniques.

Maintained person identity may then be detected, in step 406, using a low-power type measurement of the sensor device 120, 220, preferably under the assumption that a continuously present person is the same person as the one previously identified. For instance, once a person has been identified using a high-power image-based type measurement, during a subsequent time period during which a general person shape is detected using a low-power type measurement it is assumed that the same person identity is maintained. Such assumed maintained identity may then be verified by intermittent re-verification using a high-power, image-based type measurement identification of the above type.

Both for the case of said attention detection and said person identity detection, the same image captured for presence detection in step 404 may be used also for the high-power type measurement based attention detection and/or identity detection.

The potential presence detected in step 402 may be detected as any object of sufficient size being detected within a particular predetermined distance interval in relation to the relevant hardware sensor of the sensor device or an entity (such as a computer display screen) in relation to which the presence is to be detected; and/or the detection of an object approaching the sensor in question. The potential presence may also be in the form of a detected user breathing or any other detectable human characteristic, as described above.

In step 404, the detection of the actual presence may comprise the sensor device 120, 220 furthermore detecting a distance to the present person using a distance sensor performing at least one of said at least one low-power type measurements. Then, the sensor device 120, 220 may further use the detected distance in the image-based detection in step 404. For instance, such distance detection may be used to determine a typical in-image size of a particular set of depicted facial features.

Steps 403 and 404 may be performed several times, such as during a predetermined time period or until an actual presence has been detected. If such actual presence detection ultimately fails in step 404, the method may reiterate to step 402 as described above. Such a predetermined period may depend on circumstances, but may for instance be at the most 10 seconds.

However, in some embodiments the method may instead, after such a failure of the high-power type measurement detection by the sensor device 120, 220 of a verifying actual person presence based on the captured image in step 404, move to a subsequent step 405. In step 405, the sensor device then again attempts to detect a potential presence of the person. This potential presence detection may be performed using a high-power and/or a low-power type measurement performed by the sensor device 120, 220. Since a potential person presence was recently detected, in step 402, it can be assumed that there is an actual presence with relatively high probability, why it may be efficient to use a high-power type measurement to perform a potential presence detection at this point. In particular, such potential presence may be performed using a high-power type measurement employing digital image processing aiming at detecting human-like movement or shape in a video stream captured by said image sensor. Alternatively, a low-power type measurement may be used for this detection of potential presence in step 405.

Specifically, what may be checked for in step 405 comprises one or several of the existence of human-like motion and/or shape, such as continuous motion patterns fulfilling predetermined parameter criteria, such as movements within particular predetermined movement speed intervals plausible for human bodies. Hence, the detected movement in this case is a movement having possibly human characteristics, such as with respect to movement continuity or speed, or wherein said object is detected to have a potentially human shape.

In addition, or alternatively, what may be checked for in step 405 comprises the detection of any object, or any object with a minimum predetermined size, within a particular predetermined distance from the sensor in question. This distance may then be detected by high-power image analysis (of a freshly captured image by the image sensor) and/or by a low-power proximity detector. Hence, in this case the detected movement or object is detected to be within a particular distance from said sensor.

In case a potential presence is detected in step 405, the sensor device 120, 220 may then move back to step 403, in which the sensor device 120, 220 as a part of a high-power type measurement causes the production of another image depicting the person and detecting the presence of the person based on digital image analysis of said other image as described above.

Steps 403-405 may be iterated in this way until a predetermined time has passed since the last verified person presence detection and/or the last detected motion falling within said predetermined categories and/or the last failed attempt at detecting the verified presence of the person. In particular, the predetermined time may be from the last performance of step 404 or 405. If this time limit is reached, the method moves back to step 402.

Figure 3:
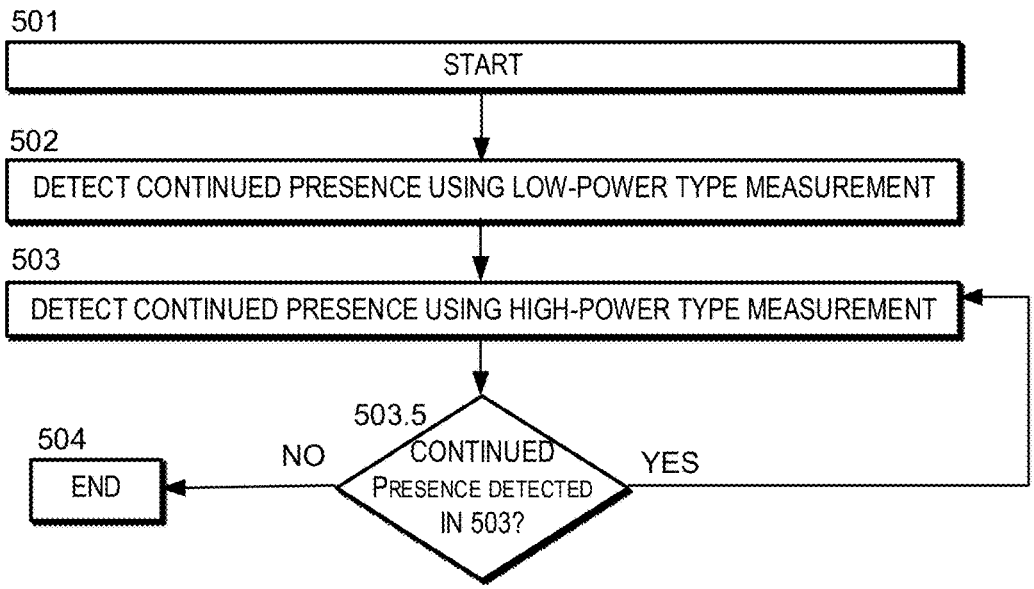
FIG. 3 is a flow chart illustrating a part of a method according to the present invention.

FIG. 3 is a flowchart illustrating the different method steps comprised in step 406, performed in order to detect a maintained person presence.

In a first step 501, this part of the method starts, at the beginning of each iteration of step 406.

In a subsequent step 502, a continued presence of the person is detected by the sensor device using a low-power type measurement. Such low-power type measurement detection may iterate as long as particular predetermined criteria are met.

In a subsequent step 503, a continued presence of the person is detected by the sensor device 120, 220 using a high-power type measurement. As indicated in subsequent step 503.5, in case such high-power detection is successful, the method may reiterate back to step 502.

As indicated in step 503.5, if no continued presence can be detected in step 503, the method, in a subsequent step 504, ends. Thereafter, the method returns back to step 406 for continued processing.

As can be seen from FIG. 3 and from the above, in general, step 406 may comprise the sensor device 120, 220 being arranged to detect the person using a high-power type measurement as a verification of a previous detection of the person using a low-power type measurement in the same step 406, using iteration of steps 502-503. Furthermore, the same step 406 may further comprise the sensor device thereafter again detecting the person using a low-power type detection, in the second and later iterations of step 502.

More particularly, the low-power detection in step 502 may comprise the identification of an object, in the form of a contour, a shape or general extension of a human body. This object detection may be performed by the image sensor of the sensor device 120, 220, but using a low-power type detection, implying a simpler algorithm than a full-fledged image analysis arranged to for instance identify facial features from a captured image. For instance, a simple statistical calculation using column sums or similar can be employed.

In some embodiments, a previous successful high-power type measurement detection of the person, such as an image captured in step 403 and analysed in step 404, may be used as a starting point or input parameter value for the low-power detection in step 502. For instance, step 404 may comprise the calculation of a contour of the detected person, after which this detected contour can be used in step 502 by only analysing the movement of the contour as such. Then, a movement pattern of the object is verified.

It is realized, however, that any low-power type measurement detection of an object may be used for step 502. In many cases, it is preferred that a detected object is identified and that a change of the same detected object is analysed between consecutive iterations of step 502, rather than step 502 involving making a completely fresh low-power reading to find any objects. It is then any difference between the detected object that is analysed in at least the second and each subsequent iteration of step 502 within the same iteration of step 406.

For instance, so long as the contour only displays sufficiently human-like transformations the detection of maintained presence in step 502 is affirmative. More particularly, said verification of a movement pattern of the detected object, such as said contour, may comprise the detection of a continuous movement of the object at speeds lower than a predetermined speed threshold; the maintaining of a continuous shape of the contour; and/or that the contour does not move discontinuously, such as making suddenly jumps around in the image or disappearing completely or suddenly reappearing from one time to another.

One example is that the movement pattern comprises a movement of the object/contour towards or away from a shape-detecting sensor of the sensor device 120, 220, resulting in a perceived general size change of the object. In case such general size change without a position in the image of the object changes more than at a predetermined speed; and possibly also if an captured image intensity at the position of the object in the image stays the same within predetermined limits, it can be concluded that the detected person is still present.

Hence, the detection in step 502 may in this way comprise a position, shape and/or location tracking of the object in question.

The repetition of step 502 may be performed until a predetermined maximum time, such as at the most 10 seconds, has been reached since the last high-power detection of the presence of the person in step 404 or 503.

The detection in step 503, made using a high-power type measurement performed by the sensor device 120, 220, may comprise the image-based digital image analysis detection of a predetermined physical human facial feature, such as an ear, a nose, a pair of glasses, an eye or a mouth. The detection in step 503 may also comprise the image analysis-based detection of human breathing or a pulse, or even blood pressure or blood flow. Such image-based detection is known as such, and will not be described in detail herein. Importantly, however, such facial feature, breathing, pulse, etc. detection may be performed on one or several images/ video streams captured by the image sensor and additionally using image coordinate information regarding the size, orientation, shape and/or location of the object as measured using a low-power type measurement as a part of the tracking of the object in step 502.

For instance, in case a person is detected in step 404 using a high-power type measurement providing details regarding the visual appearance of the detected person, a contour of the detected person is determined in fed into the iteration step 502. In step 502, the contour is tracked as the person moves around in the expected person location, to substantially lower CPU cost than performing a full high-power type measurement with the aim of a verifying detection of the actual presence of the person such as performed in step 502.

Once entering step 503, updated information of the detected person will be available for the facial feature, breathing, pulse, etc. detection, which may then be performed using a more specific image-processing algorithm. For instance, in an image captured in step 503, only areas that may plausibly contain facial features (in other words, where the person's head is expected to be located in the image based on the movement of the person's contour since the last high-power type measurement detection) are analysed for facial feature detection.

In other examples, a low-power type measurement detection in step 502 in the form of a distance measurement can be fed forward to the detection in step 503, so that facial features or similar are only detected within a particular distance from the image sensor at which an object was detected in step 502 by a distance sensor employed in step 502.

Naturally, there are numerous other examples of a high-power type measurement interacting with a low-power type measurement for following a present person over time and to minimize computing expense in finding and analysing detail features necessary for verification of the person's presence and/or identity.

Generally put, the detection in step 406 performed using a high-power type measurement of the sensor device 120, 220 may use as an input parameter a detected object which has been tracked over time using the sensor device 120, 220 using a low-power type measurement, by an expected location in the image of a facial feature being determined being based on an updated position of said tracked object.

Furthermore, the high-power type measurement detection in step 503 can be seen as a verification of the low-power type measurement detection in step 502, the latter then being seen as a detection of a potential maintained presence. Hence, step 406 in this case comprises detecting a maintained presence of the person by the sensor device 120, 220 using a low-power type measurement (step 502), and when a predetermined condition of the above mentioned type is met, the method comprises requiring (step 503) a presence detection by the sensor device 120, 220 using a high-power type measurement to detect a maintained presence of the person.

In some embodiments, the sensor device 120, 220 is arranged to perform the detection in step 502 using a variable definition of the presence of the person (the definition of what it means to successfully detect such "presence"), so that a strict definition results in relatively fewer false positive detections and a less strict definition results in relatively more false positive detection. For instance, a person presence may be detected in case an object is continuously detected by a distance sensor, in a direction from said distance sensor where a verified high-power detection was previously made of the person, as long as the detected distance to said object does not change more than a predetermined absolute amount. Then, a strict definition of "presence" would mean that the distance can vary less over time and still be considered "detected" by the sensor device.

Said definition used in the low-power type measurement in step 502 may be arranged to vary over time, and in particular to become more strict as a function of an increasing time duration since the last high-power type measurement detection was performed, which may have taken place in the last performance of step 503 or 404.

In another example, a contour detection made in step 502 may use a stricter definition of a valid movement of such a contour in order to successfully detect a maintained presence in step 502 as a function of increased times since the last successful high-power type measurement detection of the person corresponding to said contour.

A maximum time between two consecutive performances of step 503 may also depend on a parameter value detected by the sensor device 120, 220 in a low-power type measurement in step 502. For instance, a maximum such time between two high-power type measurement detections in order to detect a maintained presence may decrease with an increased distance to an object corresponding to a detected person, which object distance is measured by a distance sensor of the sensor device 120, 220 in step 502.

In yet further embodiments, the sensor device 120, 220 is arranged to, using a low-power type measurement, detect a user keyboard or mouse 150 input. In this case, such detected input is used for the detection of maintained presence in step 406. In particular, the low-power type measurement detection in step 502 may comprise the sensor device 120, 220 detecting, such as in addition to the detection activity described above, mouse/keyboard 150 input, and this input detection may then be interpreted as a detected maintained presence of the person.

In some embodiments, the method may comprise a step in which information regarding a physical geometry of the expected person location is provided to the sensor device 120, 220, and in particular information sufficient for the system to derive a physical geometric relationship between one or several of said sensors. Such a priori information regarding the expected person location may then be used in the detection in step 406. For instance, such information may be used to define angular limits for a valid low-power type measurement detection in step 502 using an object distance or image-based contour detector. In this and other cases, a maintained presence may be deemed not to have been detected in case an object is not detected within an expected sub-part of the expected person location in step 502, such as in case a detected object moves outside of such expected sub-part. In other examples, a detection of a potential presence in step 502 outside of such an expected sub-part of the expected person location may trigger a move to step 503, or a high-power type measurement verification detection of the maintained person presence.

Previously known information regarding the geometry of the expected person location may also be used in step 503, for instance as an input to an image-based detection of facial features. As an example, the digital image analysis may presuppose that a person's head faces a particular point of interest where an expected geometric relationship between an expected person, the image sensor and said point of interest is known and available to the sensor device 120, 220.

It is understood that such previously known information can also be used, in a corresponding manner, in steps 402 and/or 404.

In some embodiments, said previously known geometric information comprises information regarding a number and/or orientation of display screens 110a, 110b; 210, or even particular rendered objects displayed by the system on such display screens, that the person is expected to use in the said expected person location.

In some embodiments, said previously known geometric information comprises information regarding a physical object external to the system 100, 200. For instance, if the system is installed in a vehicle and the driver is the person whose presence and attention is to be detected, the system may have access to or continuously calculate a geometric relation between relevant sensors and one or several physical points in space onto which it is to be verified that the user pays her attention. Such points in space may comprise a point in front of the vehicle or detected physical objects of interest in front of and/or around the vehicle as the vehicle moves.

Many times an image sensor may have a wider field of view than a sensor used in said low-power type measurement, such as a motion detecting sensor. In this case, low-power type measurement detection steps 402 and/or 502 may be performed using the low-power sensor in question, and if no detection is possible by that sensor the image sensor may be activated for performing a low-power image-based detection, such as a coarse motion detection, in a part of the captured image being outside of the field of view of the low-power sensor.

As described above, the present invention achieves reliable yet computationally efficient detection of the presence of a person at an expected person location. Once such presence has been detected, this can be used in different ways.

One example is as the basis for a keep-awake function of a piece of electronic equipment, such as a computer display screen 110a, 110b; 210. Namely, as long as a maintained presence of a person is detected in step 406, said equipment would not be allowed to enter a low-energy mode, such as a sleep mode. The electronic equipment may, in other examples, be a handheld device such as a smartphone or a smartwatch.

In another example, the detected maintained presence, and in particular the above described detected maintained attention focus, may be used to maintain a focused state of a subsystem. For instance, a computer game can use a better-quality rendering, such as using increased rendering pixel resolution, on a screen which is presently viewed by a detected person, for instance when it is detected that the user maintains her head faced towards said screen. Further, the detected maintained attention focus can be used to amend other rendering parameters, such as updating frequency and dynamic range.

In yet another example, the maintained presence detection may be used as an input to a method for authentication. Then, the detection by the sensor device using a high-power type measurement may comprise an image analysis-based identification of the person.

In case a first high-power type measurement detection step 404, 503 identifies a present person as a first user, and a subsequently performed high-power type measurement detection step 404, 503 identifies a present person as a second user, a user or calibration profile used in the system 100, 200 may automatically be switched from such a profile being associated with the first user to such a profile being associated with the second profile.

A sub system may be arranged to keep track of a login or other authentication of a user. Then, in an initial step, such as in connection to step 404 described above, the user may be authenticated and it may be established that the authenticated user is the person detected in step 404 to be physically present in the expected person location. For instance, the authentication may be based on the high-power type measurement identification of facial features of the person as described above, or a facial constitution depicted in the captured image may be compared to a photograph or other available data (such as biometric data) relating to the user in question. Thereafter, a detected maintained presence in step 406 may be interpreted as a continuous physical presence of the user in the expected person location, and that the user needs not be re-authenticated during such maintained presence. The maintained presence high-power type measurement verification step 503 may comprise performing an automatic re-authentication of the user based on the image captured as a part of step 503 (see above), still without the user needing to manually re-authenticate. Hence, as long as maintained presence can be detected in step 406, or at least before a predetermined maximum time has been reached or any other predetermined security parameter values have been met, the user will not need to manually enter a password or similar for maintaining an authenticated state in relation to the system 100, 200.

Figure 4:
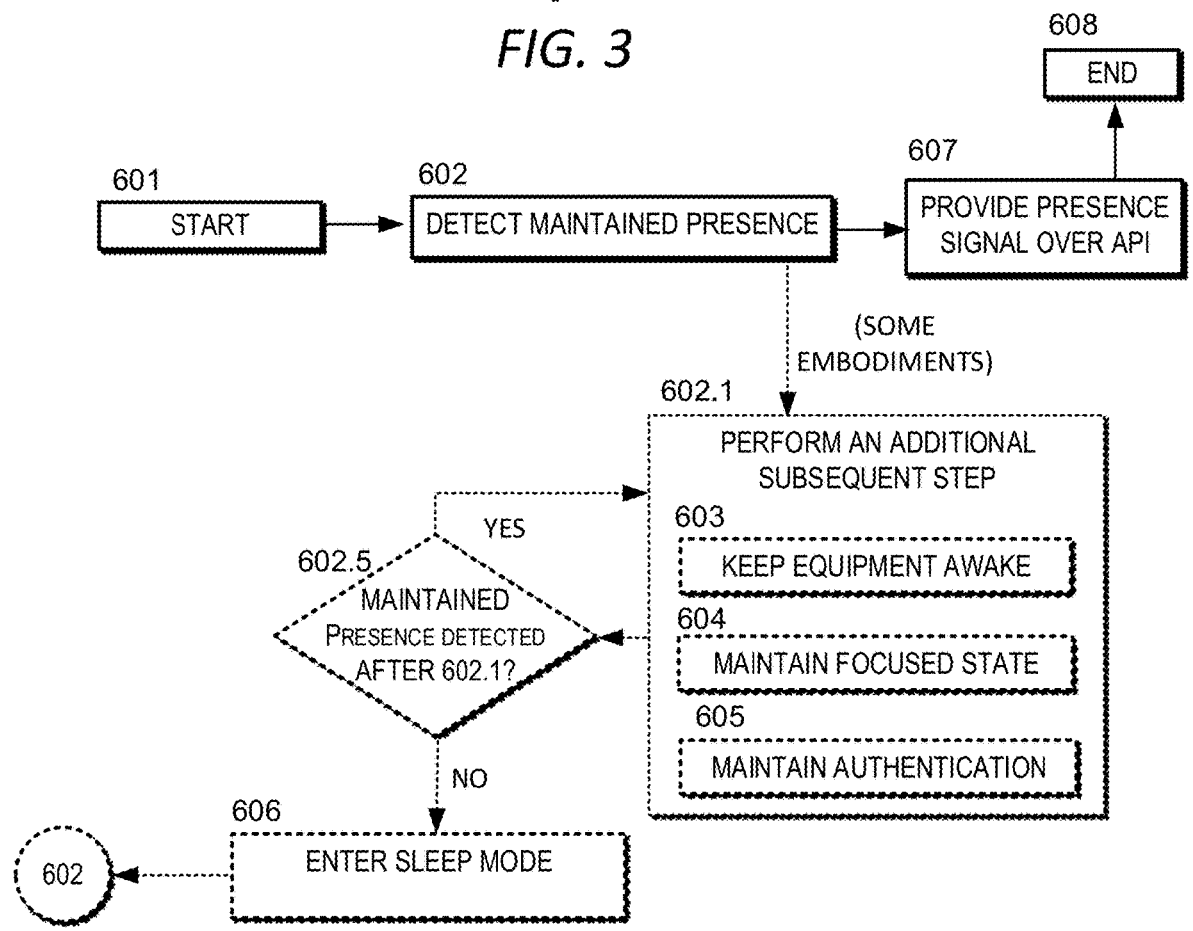
FIG. 4 is a flow chart illustrating a part of a method according to the present invention.

FIG. 4 illustrates these alternatives in a method according to the present invention, that can be combined in any way.

In a step 601, the method starts.

In a subsequent step 602, a maintained presence is detected as has been described above in connection to FIGS. 2 and 3.

In a first possible subsequent step 603 of step 602.1, said electronic equipment is kept awake, as described above.

In a second possible subsequent step 604 of step 602.1, a defined focused state of the system 100, 200 is maintained as has also been described above.

In a third possible subsequent step 605 of step 602.1, a user authentication is maintained as described above.

After each such possible step 603, 604, 605, the method may proceed to step 602.5, which reiterates step 602 for continued detection of a maintained presence according to step 406.

Once a maintained presence is not detected at step 602.5, in a subsequent step 606, the equipment may be allowed to enter sleep-mode; a focused state is detected to no longer be present; and/or an authentication can be allowed to lapse, as the case may be. Then, the method may reiterate to step 602 for renewed detection of a (new) maintained person presence in the expected person location.

According to a preferred embodiment, the method of the present invention further comprises producing an information signal reflecting if a person is currently present in the expected person location or not, in other words if the last known detection state measured by the sensor device 120, 220 is "actually present" or "not confirmed to be actually present". At least this information, and possibly also additional information based upon sensor device 120, 220 measurement and analysis, is provided as said information signal over an API, so that sensor device-external computer software functions can access the signal over said API for respective internal use. Such an API may be a system-external API, via which system-external information consumers may be provided said information, or it may be a system-internal API, via which system-internal consumers, such as a rendering engine of a computer game, can be provided said information. Such internal and/or external information consumers may then decide on different courses of action depending on whether or not the person is presently present or not at the expected person location.

In addition to updated presence information, updated person attention focus and/or user authentication information may also be comprised in said signal, with interpretation of such provided information being the same as above.

Such updated information signal may be provided intermittently or substantially continuously over said API, in step 607.

In a subsequent step 608, the method ends.

As mentioned above, in addition to a method the present invention also relates to a system 100, 200 arranged to detect the physical presence of a person at said expected person location. Such a system 100, 200 comprises the sensor device 120, 220 of the type described herein. Then, the system 100, 200, such as said control software function, is arranged to perform the method steps described above. Preferably, the system 100, 200 is arranged to perform these method steps completely automatically, providing as output said information signal and/or control commands to various functional parts of the system 100, 200, such as for keeping a screen display 110a awake. As mentioned above, a computer software function according to the present invention is preferably arranged to execute on and/or from hardware of said system 100, 200, which execution results in the performance of the steps of the present method.

Namely, the invention also relates to a computer software function of the above described type, arranged to, when executing on and/or from system 100, 200 hardware, detect the physical presence of a person at said expected person location. The computer software function, which may comprise the above described control software function, is further arranged to communicate with hardware of the sensor device 120, 220 in turn comprising said one or several sensors, and to, when executed, perform the above-described method steps.

The present method may be used as a component in a broader method for power managing the system 100, 200 and in particular the sensor device 120, 220. Hence, the present method may further comprise a step in which a parameter controlling a frequency of the performance of a high-power type measurement of the type described herein is varied as a function of a current state of a power source powering the sensor device 120, 220 and/or as a function of a current setting of a power management policy in turn affecting the sensor device 120, 220. For instance, such a parameter may determine a maximum time period before the method iterates from step 502 to step 503 during the detection of maintained presence of the user. It is hence question of a balance between better detection precision and power use. For instance, the current state of a power source may be a current remaining battery life (in terms of time and/or charge) for a laptop battery powering the sensor device 120, 220. The above-described control device may be provided information regarding such a power source state and/or a power management policy, and use this information when controlling the sensor device 120, 220 to perform its low-power and high-power type measurements described above.

Above, preferred embodiments have been described. However, it is apparent to the skilled person that many modifications can be made to the disclosed embodiments without departing from the basic idea of the invention.

For instance, a system according to the present invention has been exemplified herein as a stationary or mobile personal computer-centric system; a head-mounted display system, a mobile phone or watch system and a vehicle-centric system. It is, however, realized that the present method can be used in any context where it is of interest to detect a presence and/or an attention focus of a person in relation to a physical expected person location having particular physical features, and/or wherein it is of interest to perform an automatic authentication of a physically present person.

Hence, for a head-mounted display the present method may be used to determine both that a person is present (wears the head-mounted display on her face) and also that it is a correct person wearing the display (via for instance facial feature detection and analysis). Once this has been established, an automatic authentication and keep-alive function can be performed in relation to a software function providing content on a screen display of the head-mounted display.

The detected presence, attention and/or authentication information can be combined in several additional ways. For instance, in relation to a computer screen display, a method according to the present invention can be designed to discriminate between more than two states, such as person "away", "present but not facing display" and "present and facing display". Then, this information can be used to control the display, so that detection of state "away" results in a "display off" state change, detection of state "present but not facing display" results in a "display on at low resolution rendering" state change, and detection of state "present and facing display" results in a "display on at high resolution rendering" state change. It is realized that this is merely an example, and that many such combination uses are thinkable.

A computer software function according to the invention may also be an integrated part of a computer game or any other complex computer software function. It may also be installed on the hardware of an attention detection means.

The image sensor used for said high-power type measurements may be any type of image sensor. For instance, there may be several image sensors cooperating to produce a depicted 3D model of the expected person location, which in turn may be used to determine a distance to a detected object such as a person.

In general, the embodiments described herein can be combined freely, in so far as they are mutually compatible. In particular, everything described in connection to the method is correspondingly applicable to the system and computer software function, and vice versa.

Hence, the invention is not limited to the described embodiments, but can be varied within the scope of the enclosed claims.

The invention claimed is:

1. A method for detecting a potential presence of a person at an expected person location, the method comprising the steps:
   a) providing a sensor device comprising one or several sensors, the sensor device being arranged to perform at least one high-power type measurement and at least one low-power type measurement, wherein the sensor device comprises at least one image sensor arranged to depict the person by a measurement of said high-power type, and wherein each of said low-power type measurements over time requires less electric power for operation as compared to each of said high-power type measurements;
   b) the sensor device detecting said potential presence of the person using at least one of said low-power type measurements;
   c) using one of said high-power type measurements, the sensor device producing an image depicting the person and detecting the presence of the person based on image analysis of the image, wherein producing the image depicting the person and detecting the presence of the person comprises:
      detecting, by the sensor device, a movement or an object, using one of the high-power type measurements or one of the low-power type measurements, in response to the sensor device attempting but failing to detect the presence of the person based on the image using one of the high-power type measurements; and
      in response to detecting the movement or the object, the sensor device, using one of the high-power type measurements, causing a production of another image depicting the person and detecting the presence of the person based on using image analysis of the other image;
   d) using at least one of said low-power type measurements, the sensor device detecting a maintained presence of the person;
   e) responsive to the sensor device failing to detect the maintained presence of the person using at least one of said low-power type measurements, the sensor device producing, using one of said high-power type measurements, an image depicting the person and detecting the presence of the person based on image analysis of the image.

2. The method of claim 1, wherein the sensor device comprises a non-image-based sensor arranged to, using at least one of said low-power type measurements, detect a local presence of an object at said expected person location.

3. The method of claim 1, wherein the method comprises the steps of activating an attention detection means for the detection, using said image sensor, of an attention focus of the person when the presence of the person has been detected in said expected person location and inactivating the attention detection means for the detection of said attention focus of the person once the maintained presence of the person is no longer detected.

4. The method of claim 1, wherein the method comprises the step of activating a person identity means for the detection, using said image sensor, of the identity of the person when the presence of the person has been detected in said expected person location.

5. The method of claim 1, wherein the sensor device comprises a thermal sensor, a time-of-flight sensor, a movement sensor, a sonar sensor or a sound sensor, arranged to, using at least one of said low-power type measurements, detect a shape, a local movement or sound having typically human characteristics in the sense that the shape, local movement or sound accrues as a result of the person herself or a voluntary or involuntary activity that the person performs.

6. The method of claim 1, wherein detecting the presence of the person based on the image analysis comprises the detection of a physical feature of the person, such as a facial feature.

7. The method of claim 1, wherein step producing the image depicting the person and detecting the presence of the person further comprises detecting, by the sensor device, a distance to the person using a distance sensor in at least one of said at least one low-power type measurements, and the sensor device further using the detected distance in the image-based detection.

8. The method of claim 1, wherein detecting the maintained presence of the person comprises detecting the person using one of the high-power type measurements as a verification of a previous detection of the person using one of the low-power type measurements, and thereafter again detecting the person using one of the low-power type measurements.

9. The method of claim 8, wherein detecting the person using one of the high-power type measurements comprises at least one of an image-based detection of a predetermined physical human facial feature or an image analysis-based detection of a human breathing or pulse.

10. The method of claim 8, wherein detecting the person using at least one of said at least one low-power type measurements comprises an identification of an object, in the form of a contour or general extension of a human body, and verifying a movement pattern of said object.

11. The method of claim 10, wherein verifying the movement pattern of said object comprises the detection of a continuous movement of said object at speeds lower than a predetermined threshold.

12. The method of claim 10, wherein detecting the person using one of the high-power type measurements uses as input said object which is tracked over time using the sensor device in one of the low-power type measurements, by an expected location in the image of a facial feature being determined based on a position of said object.

13. The method of claim 1, wherein the method further comprises provision of information regarding a physical geometry of said expected person location, and wherein the sensor device uses said information in detecting the maintained presence of the person using at least one of said low-power type measurements.

14. The method of claim 1, wherein when a predetermined condition is met while detecting the maintained presence of the person by the sensor device in a low-power type measurement, causing the sensor device to perform a further presence detection using one of the high-power type measurements to detect the maintained presence of the person.

15. The method of claim 1, wherein the method further comprises producing an information signal indicating if the person is currently present in the expected person location or not, and providing said signal over an API so that computer software functions can access the signal over said API for internal use.

16. The method of claim 1, wherein the detection by the sensor device using one of the high-power type measurements comprises an image analysis-based identification of the person.

17. The method of claim 1, wherein the method further comprises the step of varying a parameter controlling a frequency of the sensor device performing the at lease one high-power type measurement as a function of a current state of a power source powering the sensor device or a current setting of a power management policy affecting the sensor device.

18. A system arranged to detect a potential presence of a person at an expected person location, the system comprising a sensor device comprising one or several sensors, the sensor device being arranged to perform at least one high-power type measurement and at least one low-power type measurement, wherein the sensor device comprises at least one image sensor arranged to depict the person by a measurement of said high-power type, and wherein each of said low-power type measurements over time requires less electric power for operation as compared to each of said high-power type measurements, wherein the system is configured to:
 a) detect, using the sensor device, said potential presence of the person using at least one of said low-power type measurements;
 b) using one of said high-power type measurements, produce, using the sensor device, an image depicting the person and detect the presence of the person based on image analysis of the image, wherein producing the image depicting the person and detecting the presence of the person comprises:
  detecting, by the sensor device, a movement or an object, using one of the high-power type measurements or one of the low-power type measurements, in response to the sensor device attempting but failing to detect the presence of the person based on the image using one of the high-power type measurements; and
  in response to detecting the movement or the object, the sensor device, using one of the high-power type measurements, causing a production of another image depicting the person and detecting the presence of the person based on using image analysis of the other image;
 c) using at least one of said low-power type measurements, detect, using the sensor device, a maintained presence of the person; and
 d) responsive to detecting a failure by the sensor device to detect the maintained presence of the person using at least one of said low-power type measurements, produce, using the sensor device using one of said high-power type measurements, a subsequent image depicting the person and detect the presence of the person based on image analysis of the subsequent image.

19. A non-transitory computer-readable medium storing instructions that when executed by a processor cause the processer to perform operations for detecting a potential presence of a person at an expected person location, the processor being arranged to communicate with a sensor device comprising one or several sensors, the sensor device being arranged to perform at least one high-power type measurement and at least one low-power type measurement, wherein the sensor device comprises at least one image sensor arranged to depict the person by a measurement of said high-power type, and wherein each of said low-power type measurements over time requires less electric power for operation as compared to each of said high-power type measurements, wherein the operations for detecting the physical presence of the person at the expected person location comprise the following steps:
 a) detecting using the sensor device, said potential presence of the person using at least one of said low-power type measurements;
 b) using one of said high-power type measurements, producing using the sensor device, an image depicting the person and detect the presence of the person based on image analysis of the image, wherein producing the image depicting the person and detecting the presence of the person comprises:
  detecting, by the sensor device, a movement or an object, using one of the high-power type measurements or one of the low-power type measurements, in response to the sensor device attempting but failing to detect the presence of the person based on the image using one of the high-power type measurements; and
  in response to detecting the movement or the object, the sensor device, using one of the high-power type measurements, causing a production of another image depicting the person and detecting the presence of the person based on using image analysis of the other image;
 c) using at least one of said low-power type measurements, detecting, using the sensor device, a maintained presence of the person; and
 d) responsive to detecting a failure by the sensor device to detect the maintained presence of the person using at least one of said low-power type measurements, producing using the sensor device using one of said high-power type measurements, a subsequent image depicting the person and detect the presence of the person based on image analysis of the subsequent image.

* * * * *